F. ANDRUSYSZYN.
CAR SEAT CONSTRUCTION.
APPLICATION FILED DEC. 1, 1921.
1,423,508.
Patented July 25, 1922.
2 SHEETS—SHEET 2.
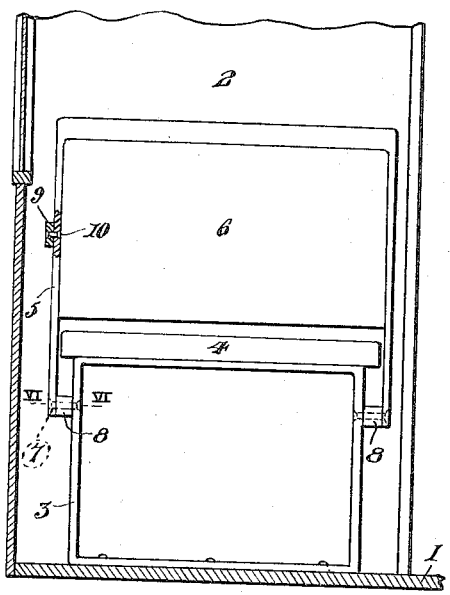
FIG. 3.
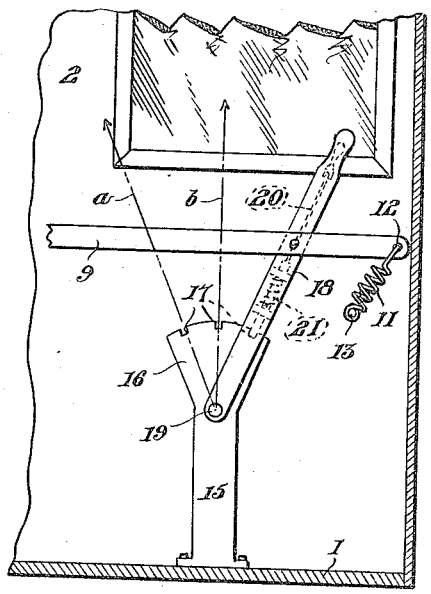
FIG. 4.
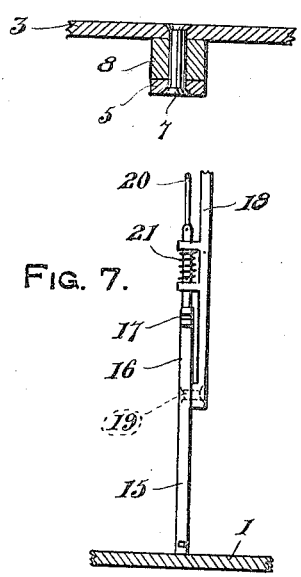
FIG. 6.
FIG. 7.
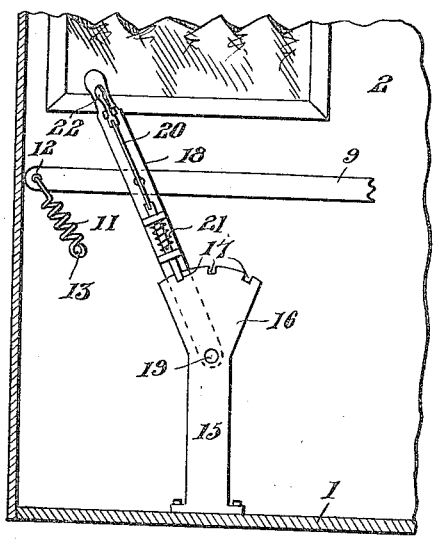
FIG. 5.
Inventor
F. Andrusyszyn
By F. K. Bryant
Attorney.

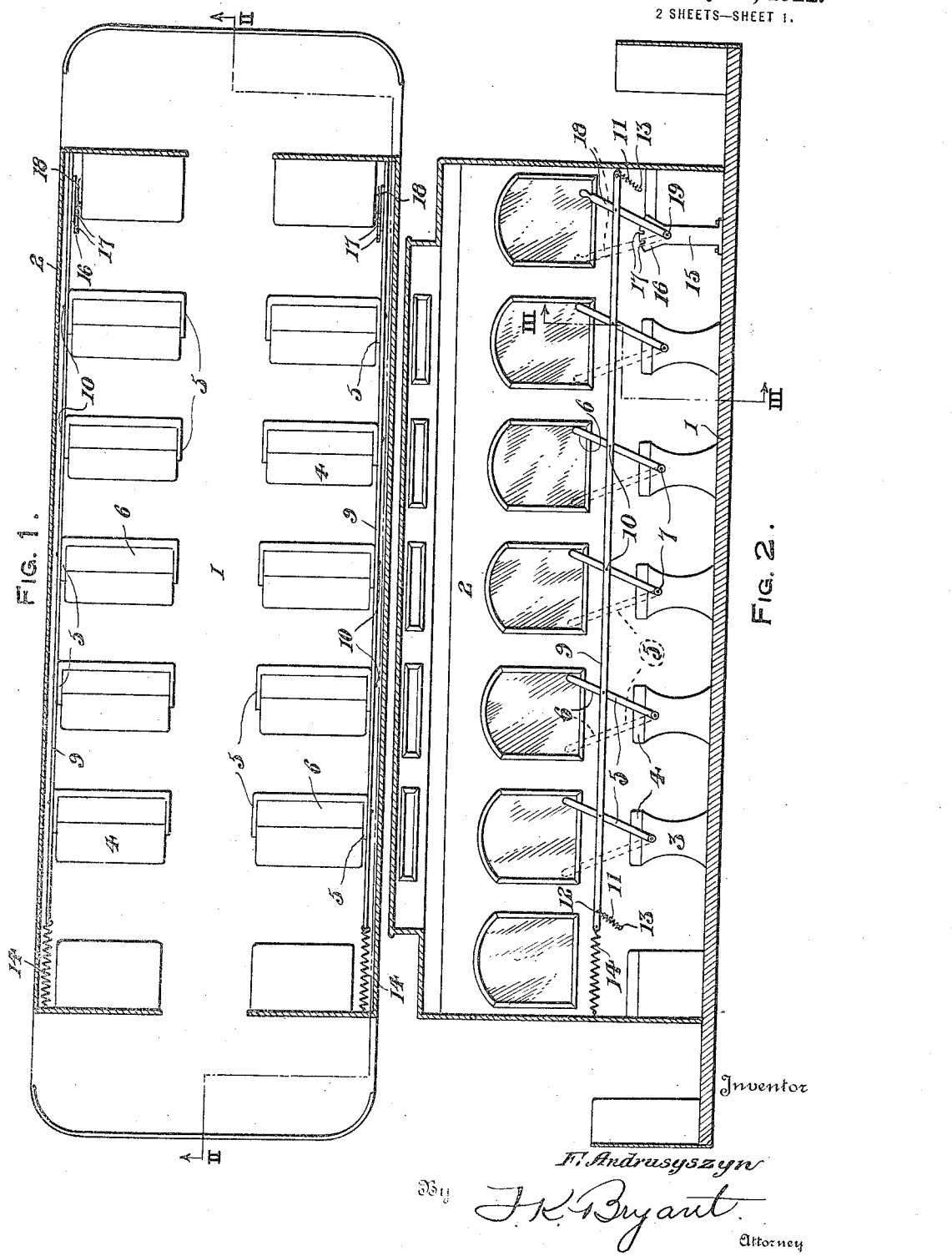

UNITED STATES PATENT OFFICE.

FRANK ANDRUSYSZYN, OF REVLOC, PENNSYLVANIA.

CAR-SEAT CONSTRUCTION.

1,423,508.                 Specification of Letters Patent.     Patented July 25, 1922.

Application filed December 1, 1921. Serial No. 519,173.

*To all whom it may concern:*

Be it known that I, FRANK ANDRUSYSZYN, a citizen of Ukraine, residing at Revloc, in the county of Cambria and State of Pennsylvania, have invented certain new and useful Improvements in Car-Seat Constructions, of which the following is a specification.

This invention relates to certain new and useful improvements in the construction of car seats and has particular reference to a swinging back for the seats.

The primary object of the invention is to provide a swinging back for a car seat with a connection between the backs to cause simultaneously swinging movement thereof in opposite directions for reversing the position of the seats.

The invention further embodies in a car seat construction, a rod pivotally supported to the adjacent side bars or arms of a seat back to cause simultaneously swinging movement thereof with tension devices associated with the rod to eliminate vibration and rattling movements.

A further object of the invention is to provide an attachment for the seat backs of cars to cause a simultaneous movement thereof with means associated with the rod for holding the same in adjusted positions, as in shifting the seat backs to reverse the position of the seats and also for holding the seat backs in an intermediate position to provide a double seating arrangement for each seat.

With the above general objects in view and others that will appear as the nature of the invention is better understood the same consists in the novel form, combination and arrangement of parts hereinafter more fully described in connection with the accompanying drawings and in which like characters indicate similar parts throughout the views.

In the drawings,

Figure 1 is a longitudinal horizontal sectional view of a car constructed in accordance with the present invention.

Figure 2 is a vertical longitudinal sectional view taken on line II—II of Figure 1 showing the connecting bar between the seat backs and the spring devices associated with the bar to prevent vibration thereof, the seat backs being illustrated by dotted lines in their shifted position, Figure 3 is a detail sectional view taken on line III—III of Figure 2 showing the pivotal mounting of the seat back and the shifting rod pivotally connected thereto, Figure 4 is a detail sectional view showing the pivoted lever for shifting the rod that is attached to the seat backs, Figure 5 is a detail sectional view, looking in the opposite direction of Figure 4 showing the tensioned latch rod for holding the seat backs in their adjusted position, Figure 6 is a detail sectional view taken on line VI—VI of Figure 3 showing the pivotal connection between the seat back and the base support for the seat, and Figure 7 is a fragmentary detail edge elevational view of the pivoted operating lever and rack segment associated with the connecting bar for the seats.

Referring more in detail to the accompanying drawings, and in particular to Figures 1 and 2, there is illustrated a conventional form of street or railway car comprising a floor or base portion 1 having the usual top 2, although it is to be understood that the present invention may as well be applied to a car of the open type.

As illustrated, double seats are arranged in series at each side of the car to provide a central aisle. Each seat comprises a base frame 3 having a seat portion 4 mounted thereon while the hinged back associated with the seat and base frame includes side arms 5 enclosing a back rest 6 with the lower ends of the side arms as clearly shown in Figures 3 and 6 pivotally supported on the pins 7 carried by the adjacent sides of the base frame 3, spacing blocks 8 being interposed between the side arms 5 and the base frame 3 to prevent lateral shifting movement of the seat back.

In order to provide for the simultaneous shifting of the seat backs from the full line position shown in Figure 2 to the dotted line position, a longitudinally extending connecting bar 9 is pivotally secured as at 10 to the adjacent side arms 5 of the seat back, and to eliminate vibration and rattling movements of the seat backs and connecting rod, tension coil springs 11 secured adjacent each end of the rod as at 12 have the lower ends thereof secured as at 13 to the adjacent side wall of the car body to exert a downward pull upon the connecting rod. As shown in Figure 2, a coil spring 14 extends between one end of the connecting rod 9 and the adjacent end of the car body 2 for normally exerting a pull upon the rod in one direction.

For the purpose of shifting the car seats, and for holding the same in adjusted positions, a standard 15 is mounted upon the floor 1 of the car adjacent the end of the rod spaced from the spring 14, the upper end of the standard being provided with an arcuate head 16 having notches 17 formed in the upper edge thereof. An operating lever 18 pivoted as at 19 upon the standard 15 carries a latch rod 20 tensioned as at 21 and operated by the handle 22, the lower end of the latch rod being selectively positioned in the segment notches 17.

Assuming that the seat backs are in the position illustrated in Figure 2, the latch rod 20 is disengaged from the segment head 17 by the standard 15 and the spring 14 will exert a pull upon the connecting rod 9 to shift the rod longitudinally of the car body and to carry therewith the seat backs 5, shifting or reversing the seat backs to the dotted line position shown in Figure 2, the lever 18 then assuming the position indicated by the arrow line —a— in Figure 4. The reverse movement of the connecting rod 9 against the tension of the spring 14 by pressure exerted on the lever 18 will restore the seats to the original position, and should it be desired to dispose the seat backs in a perpendicular position for converting the single seats for double capacity, the lever 18 is shifted to the arrow line position —b— illustrated in Figure 4 and there retained by the latch rod 20 engaging in the corresponding segment head notch 17. When the seat backs are shifted to the various positions, the pull down springs 11 will eliminate vibration and rattling of the seat backs and connecting bar while the lever 18 primarily employed for shifting the connecting rod 9 is assisted in its function when the seats are shifted in one direction, by the end spring 14.

While there is herein shown and described the preferred embodiment of the invention, it is nevertheless to be understood that minor changes may be made in the form, combination and arrangement of parts without departing from the spirit and scope of the invention as claimed.

What is claimed as new is:

A car seat construction comprising a plurality of seats arranged in series, each seat comprising a base frame, a hinged back carried by each base frame, a connecting rod pivotally secured to the corresponding sides of the seat backs, means for shifting said rod to cause a simultaneous movement of the seat backs and spring devices associated with said connecting rod to prevent vibration thereof when arranged in a set position.

In testimony whereof I affix my signature.

FRANK ANDRUSYSZYN.